(12) United States Patent  
Lawandy et al.

(10) Patent No.: US 7,220,535 B2  
(45) Date of Patent: May 22, 2007

(54) MARKING AND AUTHENTICATING ARTICLES

(75) Inventors: Nabil M. Lawandy, North Kingstown, RI (US); Jeffrey L. Conroy, Rumford, RI (US); Robert S. Afzal, Providence, RI (US); Allison Berube, Somerset, MA (US); Charles M. Zepp, Hardwick, MA (US); Andrei Smuk, Providence, RI (US)

(73) Assignee: Spectra Systems Corporation, Providence, RI (US)

( * ) Notice: Subject to any disclaimer, the term of this patent is extended or adjusted under 35 U.S.C. 154(b) by 222 days.

(21) Appl. No.: 10/165,273

(22) Filed: Jun. 6, 2002

(65) Prior Publication Data

US 2003/0012562 A1    Jan. 16, 2003

Related U.S. Application Data

(60) Provisional application No. 60/311,160, filed on Aug. 9, 2001, provisional application No. 60/310,914, filed on Aug. 8, 2001, provisional application No. 60/296,308, filed on Jun. 6, 2001.

(51) Int. Cl.
*G03C 1/00* (2006.01)
*G03C 5/00* (2006.01)
*B42D 15/00* (2006.01)

(52) U.S. Cl. .................. 430/336; 430/17; 430/24; 430/321; 430/334; 430/339; 283/72; 283/85; 283/95

(58) Field of Classification Search .............. 430/17, 430/18, 24, 292, 336, 334, 339, 321, 333; 386/126; 427/110, 168; 106/31.01, 31.15; 347/225; 428/64.4, 66.5; 235/454, 469, 235/462.12, 468; 283/72, 85, 91, 95
See application file for complete search history.

(56) References Cited

U.S. PATENT DOCUMENTS 3,513,320 A     5/1970    Weldon ................. 250/219

(Continued)

FOREIGN PATENT DOCUMENTS

EP          0 290 750 B1       1/1994

(Continued)

OTHER PUBLICATIONS

"UVT-UV Curing Systems-Why UV?: Quality: Economy", www.UVT.com.trendships_UV html, p. 1-1, Apr. 25, 2002.

(Continued)

*Primary Examiner*—Thorl Chea
(74) *Attorney, Agent, or Firm*—Harrington & Smith, PC

(57) ABSTRACT

Disclosed herein are methods and apparatus for providing markings upon objects, including the read side of an optical information media, where the markings do not substantially interfere with object, including the use of the optical information media. This invention discloses use of a coating, marking schemes, printing of markings with UV light, as well as methods and apparatus for reading and deciphering said marking. Included is an authentication scheme, where the marking may be used as a lock to limit access to information contained in an optical information media.

30 Claims, 11 Drawing Sheets

U.S. PATENT DOCUMENTS

| | | | | |
|---|---|---|---|---|
| 3,666,466 A | * | 5/1972 | Strilko | 430/333 |
| 4,102,893 A | | 7/1978 | Garner et al. | 260/326 |
| 4,343,885 A | | 8/1982 | Reardon, Jr. | 430/177 |
| 4,483,884 A | | 11/1984 | Troue | 427/54.1 |
| 4,485,123 A | | 11/1984 | Troue | 427/54.1 |
| 4,552,830 A | | 11/1985 | Reardon, Jr. | 430/281 |
| 4,582,346 A | | 4/1986 | Caprio et al. | 283/94 |
| 4,659,649 A | * | 4/1987 | Dickinson et al. | 430/280.1 |
| 5,024,898 A | | 6/1991 | Pitts et al. | 428/511 |
| 5,028,792 A | | 7/1991 | Mullis | 250/474.1 |
| 5,171,040 A | | 12/1992 | Orndorff | 283/93 |
| 5,223,358 A | * | 6/1993 | Yamada et al. | 430/18 |
| 5,267,755 A | | 12/1993 | Yamauchi et al. | 283/86 |
| 5,270,368 A | * | 12/1993 | Lent et al. | 524/236 |
| 5,297,815 A | | 3/1994 | Anderson et al. | 283/93 |
| 5,436,115 A | | 7/1995 | Mullis | 430/338 |
| 5,489,768 A | | 2/1996 | Brownstein et al. | 235/414 |
| 5,510,160 A | | 4/1996 | Jadamus et al. | 428/36.91 |
| 5,510,163 A | | 4/1996 | Sullivan et al. | 428/64.1 |
| 5,549,953 A | | 8/1996 | Li | 428/64.1 |
| 5,607,188 A | | 3/1997 | Bahns et al. | 283/113 |
| 5,608,718 A | | 3/1997 | Schiewe | 369/275.4 |
| 5,631,118 A | | 5/1997 | Gaudiana et al. | 430/270.1 |
| 5,815,484 A | | 9/1998 | Smith et al. | 369/275.1 |
| 5,885,746 A | | 3/1999 | Iwai et al. | 430/280.1 |
| 5,889,084 A | * | 3/1999 | Roth | 523/161 |
| 6,013,601 A | | 1/2000 | Gundjian | 503/201 |
| 6,037,984 A | | 3/2000 | Isnardi et al. | 348/403 |
| 6,051,298 A | | 4/2000 | Ko et al. | 428/64.1 |
| 6,120,902 A | | 9/2000 | Van Havenbergh et al. | 428/423.1 |
| 6,138,913 A | | 10/2000 | Cyr et al. | 235/468 |
| 6,140,267 A | | 10/2000 | Gundjian | 503/201 |
| 6,184,534 B1 | | 2/2001 | Stephany et al. | 250/459.1 |
| 6,203,069 B1 | * | 3/2001 | Outwater et al. | 283/88 |
| 6,219,329 B1 | | 4/2001 | Tanaka et al. | 369/275.1 |
| 6,226,109 B1 | | 5/2001 | Tompkin et al. | 359/2 |
| 6,243,480 B1 | | 6/2001 | Zhao et al. | 382/100 |
| 6,269,169 B1 | | 7/2001 | Funk et al. | 382/100 |
| 6,322,868 B1 | | 11/2001 | Bernstam | 428/64.1 |
| 6,338,933 B1 | | 1/2002 | Lawandy et al. | 430/270.1 |
| 6,343,138 B1 | | 1/2002 | Rhoads | 382/100 |
| 6,359,985 B1 | | 3/2002 | Koch et al. | 380/54 |
| 6,373,965 B1 | | 4/2002 | Liang | 382/112 |
| 6,423,478 B1 | | 7/2002 | Ha | 430/321 |
| 6,500,601 B1 | | 12/2002 | Sculler et al. | 430/302 |
| 6,531,262 B1 | | 3/2003 | Lawandy et al. | 430/270.15 |
| 2001/0037455 A1 | | 11/2001 | Lawandy et al. | 713/176 |

FOREIGN PATENT DOCUMENTS

| | | |
|---|---|---|
| EP | 0 908 875 A2 | 4/1999 |
| EP | 0 720 053 B1 | 9/2002 |
| JP | 62236867 A | 10/1987 |
| JP | 10106041 A | 4/1998 |
| JP | 10334518 A | 12/1998 |
| JP | 2000339767 A | 12/2000 |
| WO | WO-99/65696 A1 | 12/1999 |
| WO | WO-01/41056 A1 | 6/2001 |
| WO | WO-02/100914- | 12/2002 |
| WO | WO-02/101462 A1 | 12/2002 |

OTHER PUBLICATIONS

"Unique Technology Production-friendly". www.photosec.com. tech2htm, p. 1-1 Apr. 25, 2002.

"Invisible Ink". www.techreview.com.articles prototype40302.asp, pp. 1-3, Apr. 25, 2002.

"SK6400 Sony Technical Data Sheet Liquid Adhesive" Sony Chemicals Corporation. www.sonychemicals.com. pp. 1-2.

"About UV Curing Technology" Primare UV Technology. www. primarcuv.com primarcuv /aboutuv.htm. pp. 1-8, Apr. 25, 2002.

"Invisible Security" Beaver Luminescers U.V. Energized Light-Emitting Organic Compunds. www.luminescers.com appsl .html. pp. 1-2. Apr. 25, 2002.

He Tian et al., "Positive and Negative Fluorescent Imaging Induced by Naphthalimide Polymers" J. Mater Chem., 2002, 12. 1262-1267.

Sonny Jonsson et al., "Secrets of theDark", Fusion.UV Systems, Inc., 4 pgs.

"Features Common to All Currently Produced Headway Spinners", www.headwayresearch.com/products/machines.htm, pp. 1-3, Aug. 26, 2003.

"PWM32-PS-R790 Spinner System", www.headwayresearch.com/products/pwm32psr790.htm, pp. 1-3, Aug. 26, 2003.

"SA3 Advanced CD-RW Verify Your Rewritable Media", www.audiodev.com/default.asp, pp. 1-4.

* cited by examiner

MARKING AND AUTHENTICATING ARTICLES

CROSS REFERENCE TO RELATED APPLICATIONS

This application claims priority under 35 U.S.C. §119(e) to U.S. Provisional Patent Application Ser. No. 60/296,308, filed Jun. 6, 2001; U.S. Provisional Patent Application Ser. No. 60/310,914, filed Aug. 8, 2001; and, U.S. Provisional Patent Application Ser. No. 60/311,160, filed Aug. 9, 2001.

FIELD OF THE INVENTION

This invention relates to a method and apparatus for providing reliable and repeatable identification and authentication of an object.

BACKGROUND OF THE INVENTION

Many articles, such as optical media, including DVDs (digital versatile discs) and CDs (compact discs), as well as documents such as passports, personal identification, artwork and others are frequently considered valuable. Advancements in various printing and other technologies have improved the ability to incorporate identification information into many of these articles. As a result, schemes for including information have become increasingly sophisticated. For example, security marking schemes now include various embodiments of logos, bar codes and digital watermarks. However, some items, such as optical media present challenges to existing technology, and require further advanced schemes.

An example of an advanced security marking is a digital watermark. Digital watermarks are known, and increasingly used in a variety of applications. Watermarks, or signatures, are typically produced by using semantic information of the item to be protected. For example, digital watermarks may include alphanumeric characters, physical features, etc. or other related information (e.g. ownership information). These signatures, or watermarks, are typically kept with, or incorporated covertly or overtly into the item to be protected. For example, a watermark may be printed within the substrate of a negotiable instrument that includes information regarding the value and the originator of the instrument.

Various digital watermarking techniques are known for both still and video images. For example, reference may be had to U.S. Pat. No. 6,343,138 B1, entitled "Security Documents with Hidden Digital Data", issued Jan. 29, 2002. This patent discloses, among other things, embedding a digital watermark into a video signal or a still image.

Some of the known techniques include separately coding the image and a watermark image using a pseudo random number generator and a discrete cosine transform (DCT) to form coded blocks, one of the image to be watermarked and the other of the watermark itself. The DCT coefficients representing the coded watermark block and the coded image block are then added together to form a combined block thus digitally watermarking the image.

Reference may also be had to U.S. Pat. No. 6,037,984, entitled "Method and Apparatus for Embedding a Watermark into a Digital Image or Image Sequence," by Isnardi et al., issued Mar. 14, 2000. This patent discloses watermarking an image or sequence of images using a conventional DCT unit and quantizer. The patent discloses generating an array of quantized DCT coefficients and watermarking the array by selecting certain ones of the DCT coefficients and replacing them with zero values. The masked array is further processed by a watermark inserter that replaces the zero valued coefficients with predefined watermark coefficients to form a watermarked array of DCT coefficients, that is, a watermarked image.

Techniques for embedding a watermark are typically dependent upon the substrate, and the existing technology for marking the substrate. For example, one technology that has been useful in the improvement of the quality of still images is printing of images with UV curable ink. Inks, which require UV exposure to cure, are generally considered to be superior to traditional solvent-based inks for reasons that include the versatile application of the ink. Ease of application has resulted from, among other things, the solid composition of the ink, the ink can be laid down heavily, and cured almost instantaneously. Other advantages include increased wear, and better color control. Although printing with UV curable ink can provide for improved printed images over conventional solvent-based inks, it does not lend itself well to some marking applications. For instance, printing with UV curable ink may improve the quality of a marking on the backside of a CD, however, addition of such ink would impede the functionality if deposited on the read side.

It is also well known to apply fluorescent coatings for identification. Reference in this regard may be had to U.S. Pat. No. 3,513,320, entitled "Article Identification System Detecting Plurality of Colors Disposed on Article," issued May 19, 1970, by Weldon.

In addition, invisible ink may used to provide concealed markings. For example, reference may be had to U.S. Pat. No. 6,203,069, entitled "Label Having an Invisible Bar Code Applied Thereon," issued May 8, 2001. Additionally, U.S. Pat. No. 6,138,913, entitled "Security Document and Method Using Invisible Coded Markings," issued Oct. 31, 2000. These patents disclose variations of invisible bar codes, wherein invisible ink is used in a bar code.

It is further known that fluorescing materials may be incorporated into various materials, including polymeric materials. For example, reference may be bad to U.S. Pat. No. 6,120,902 "Luminescent Article with Protective Coating and Manufacture" issued Sep. 19, 2000. This patent discloses the use of luminescent materials to create a luminescent article, the coating of the materials, and the curing of the coating with radiation. Although such combinations of materials may provide some advantages, the combination of luminescent materials and a coating may not be adequate for some sophisticated marking schemes.

Further, it is known to apply radiation sensitive coatings to objects for imaging by exposure to light of various wavelengths. Furthermore, the use of photo-generated acids in combinations with acid sensitive color forming compounds is well known. For example, refer to U.S. Pat. No. 5,436,115, entitled "Systems for the Visualization of Exposure to Ultraviolet Radiation," issued Jul. 25, 1995. Likewise, invisible fluorescent images may be developed using similar technology and acid sensitive fluorescent dyes, such as those reported in "Positive and negative fluorescent imaging induced by naphthalimide polymers" by He Tian, Jiaan Gan, Kongchang Chen, Jun He, Qun Liang Songb and Xiao Yuan Houb, Journal of Materials Chemistry 2002, 12, 1262–1267.

In addition, reference may be bad to U.S. Patents directed towards optical storage systems. For example, U.S. Pat. No. 5,549,953, entitled "Optical Recording Media Having Optically-Variable Security Properties" by Li Li, issued Aug. 27, 1996, discloses a technique to prevent counterfeiting of various substrates through introducing thin film structures having optically variable security properties and encoded optical data. This patent discloses the use of a multilayer interference coating, which may be characterized by optically variable properties. However, the teachings of this patent can be difficult to implement in a high volume optical media production environment.

Another U.S. Pat. No. 5,510,163, entitled "Optical Storage Media Having Visible Logos", by Sullivan, et al., issued on Apr. 23, 1996. This patent also discloses a technique to prevent counterfeiting of optical storage media, specifically through producing a visible logo on the read side of the substrate. This patent discloses deposition processes for production of a logo coating, such as evaporation or sputtering, chemical vapor deposition, and others. The logos are prepared by exposing either some or all of the layers through a mask. As with U.S. Pat. No. 5,549,953, the teachings of this patent may be difficult to implement in a high volume production environment.

A need exists to provide enhanced identification, authentication and encoding capabilities for various articles of manufacture, including media containing optically readable information. More specifically, a need exists to rapidly produce images, text, or other optically encoded information on the read side of optical media. Further more, the method should not interfere with the performance of data readout from the optical media.

SUMMARY OF THE INVENTION

The foregoing and other problems are overcome by methods and apparatus in accordance with embodiments of this invention.

A method and apparatus for identifying and authenticating articles including, but not limited to, CDs and DVDs is disclosed. Aspects of the invention include, but are not limited to, the steps of applying a coating to an article, applying at least one information bearing marking to the coating, and subsequently reading and deciphering the marking. The marking may be compared to known information to provide for authentication of the article.

Aspects of the invention include application of the coating and the marking upon the read side of the optical media, without loss of the functionality of the media.

Further aspects of the invention include, but are not limited to, using a photosensitive material as a coating on an article, using an authentication scheme that may include a digital watermark, and using exposure to wavelengths of ultraviolet (UV) light to form an information bearing marking in the coating. A subsequent step involves using equipment for reading and deciphering the information bearing marking, which may include, but is not limited to, a light source for illumination of the marking, a charge coupled device (CCD) photodetector array, and a signal processor.

Aspects of the invention may further include, but are not limited to, the use of coatings that absorb or reflect light at predetermined wavelengths, the use of multiple markings, and the use of markings as a pass key to access to the information contained within or upon an article.

Aspects of the invention include application of the coating and the marking upon the read side of the optical media, without loss of the functionality of the media. Furthermore, said invention allows the utilization of the read side of the optical media for advertising, branding, and other markings normally associated with the label side of the media.

DETAILED DESCRIPTION OF THE INVENTION

Figure 1:
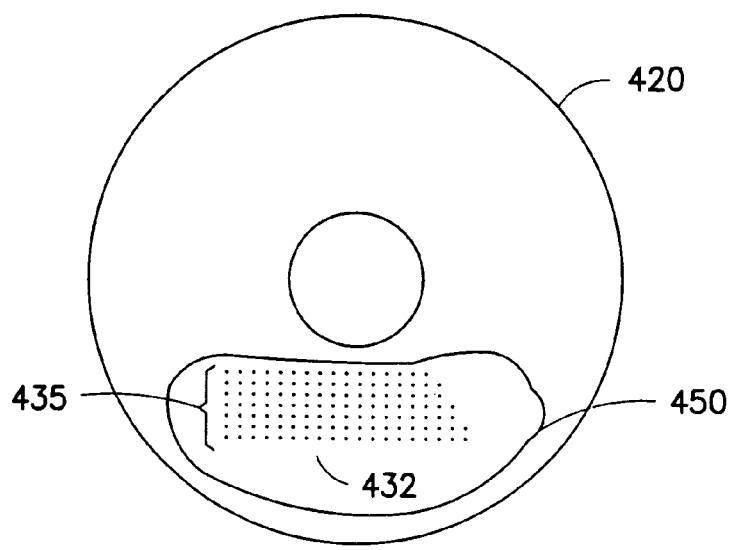
FIG. 1 is a diagram of an optical media, such as a CD or DVD, that contains a coating containing an information bearing marking that includes a digital watermark.

The teachings herein describe a coating for application to an article, for example, an optical information media such as a CD (compact disc) or a DVD (digital versatile disc). Included in the coating is an information bearing marking that may be used to establish the authenticity of the article, as well as for other purposes, such as providing promotional information, point of origin information, instructional information and other types of desired information. The information is presented as at least one marking. The marking may be included on the read side of an optical information media, without substantial interference with the functionality of the optical media. Although the teachings herein are in reference to optical media, one skilled in the art can appreciate that these teachings are applicable to a variety of articles, where incorporation of an information bearing marking may be desirable.

While the teachings herein are described in the context of the presently preferred embodiments, that is in the context of optical information media, for example, a CD or DVD, it should be understood that these teachings may be directed to any article or components of an article that contain materials that exhibit UV photo-absorptive properties. For example, other types of information bearing media, or articles, may exhibit properties useful for practice of this invention. Consider, for example, the use of various polymers in the construction of durable identification documents, such as driver's licenses and passports. The teachings herein may be used to provide information bearing markings in these and other articles so as to provide for, as examples, visual identification or authentication of the article.

Disclosed herein is use of a coating containing information that in one embodiment is used to establish the authenticity of an article. The information is inscribed into the coating through irradiation with UV light, according to a predetermined pattern. The pattern is presented as at least one information bearing marking, also referred to herein as a marking. The marking may include various components, for example, a logo and a digital watermark. In one embodiment, the marking appears as a result of photoabsorption in the coating, when the coating is properly illuminated. In another embodiment, the marking appears as a result of photobleaching in the coating. Illumination sources may include, among others, sources of visible light, and sources of low intensity UV light. The coating and the marking have further absorption properties wherein the coating and the marking do not appreciably absorb light of a wavelength or wavelengths used to readout information from the article. For example, in the preferred embodiments, the coating does not appreciably absorb light in at least one of those wavelengths used to readout a CD ROM or a DVD (for example, 780 nm, or 620 nm to 650 nm). Security features, referred to herein as "taggants", may be used in cooperation with the marking to establish the authenticity of the article.

What is meant by the expression "does not appreciably absorb light" is that the optical information media may still be reliably read by an appropriate readout device. Said another way, the coating is preferably substantially transparent at the readout wavelength (wavelengths) of interest, and therefore, the coating does not interfere with the intended functionality of the optical media. Also, for the embodiments where the information bearing marking is formed on the readout side, the information bearing marking does not interfere with the functionality of the optical media.

Also as used herein, "substantially absorbing," means the material is absorbing of UV light to a degree that visible contrast appears between the exposed and unexposed regions of the material, when the material is subsequently illuminated with wavelengths of UV in the presence of fluorescent materials. In one embodiment, long-wave UV, also referred to as "black light," is used to illuminate the material. As referred to herein, the "readout side" or "readout area" refers to the area of an optical media where a readout laser is used to obtain data contained within the optical media.

In one embodiment, a coating is applied to the read side of an optical media, such as a compact disc (CD). The coating is formed of a suitable material, such as a photocurable acrylate-based polymer frequently used in the manufacture of compact discs. The polymer contains a photosensitive pigment. The polymer mixture is applied by use of, for example, a spin coating process, and is cured appropriately. Subsequently, the coating is irradiated with ultraviolet (UV) light. The irradiation is completed through use of a previously manufactured photomask, which carries an image of the information bearing marking to be formed in the coating. The UV light affects the photosensitive pigment carried in the polymer coating through a process known as photobleaching. Once the irradiation has been completed, the CD may be characterized by the appearance of a visible marking upon the read side of the media, wherein the marking correlates to the photomask image. In this embodiment, the information bearing marking and coating are selected and applied in a manner such that the appearance of the information bearing marking does not interfere, or does not substantially interfere, with the functionality of the CD and the readout mechanism.

In another embodiment, polymeric material used in the read side of a DVD is exposed to UV light. The UV light is directed to the DVD by, for example, a UV laser. Characteristics of the UV laser are managed by an external system controller, such as for example, a personal computer. The controller manages, among other things, position, movement, and power level for the UV laser in order to create a marking. Once the irradiation has been completed, the exposed portion of the DVD may be characterized by increased photoabosorption of wavelengths of UV light. The increased photoabsorption of UV light becomes apparent at visible wavelengths, through the use of fluorescent materials. In one example of the use of fluorescent materials, a fluorescent dye is mixed into material incorporated into the DVD, such as within the polymeric material. Subsequently, when the DVD is illuminated with wavelengths of UV light, the previously exposed portion of the DVD absorbs UV light at a greater rate than the unexposed or less exposed region, causing reduced fluorescence from the dye. The fluorescent materials emit wavelengths in the visible region. Thus, a visible contrast is established, wherein the contrast correlates to the marking imparted by the UV laser. In this embodiment, the information bearing marking and fluorescent materials are selected and applied in a manner such that the appearance of the information bearing marking does not interfere, or does not substantially interfere, with the functionality of the DVD and the readout mechanism.

FIG. 1 shows an article 420, such as an optical information medium. The article 420 includes a coating 450 with an information bearing marking 432. The information bearing marking 432 includes a digital watermark 435. The information bearing marking 432 may be, but is not necessarily, unique in form and/or information content for each article 420 so marked. For example, in one embodiment, the information bearing marking 432 encodes, at least in part, a unique serial number. In another embodiment, the information bearing marking 432 may encode only the manufacturer's name, place of manufacture and date of manufacture.

The Coating 450

The coating 450 does not interfere, or substantially interfere, with the functionality of the article 420. That is, in the case of the preferred embodiment, the coating 450 does not appreciably absorb or scatter light at the readout wavelength of the optical media readout laser. Likewise, the thickness of the coating 450 does not interfere with the readout mechanism. The coating 450 may be applied to the "play" or "non-play" side of the optical information media 420. Although material used for retention of a marking 432 is referred to as a coating 450, some articles 420 may inherently include materials that are suited for practice of this invention. Where these materials are present, and it is desirable to imbed a marking into the inherently included materials, these materials are likewise referred to herein as a "coating," for convenience.

Techniques for applying the coating 450 may include, but are not limited to, printing, spraying, rolling, spin coating, painting or any other technique suitable for applying a coating, such as the coating 450 described herein.

The coating 450 preferably contains at least one material that is sensitive to NV light. Upon irradiation to appropriate levels of UV light, the photosensitive materials are modified and undergo changes in optical characteristics. Thus, the reflection and/or absorption wavelengths of the materials can be modified. The coating 450 may include, but is not limited to, compounds such as photoacid or photobase generators, acid or base sensitive dyes, leucodyes, metal chelates, fluorescent dyes, or laser dyes. In other embodiments, the coating 450 may include organic phosphors or inorganic phosphors. In the case where the coating 450 includes an inorganic phosphor, the coating 450 may contain silver doped zinc sulfide (Ag:ZnS). The coating 450 may be colored or colorless to the eye, and may be fluorescent under certain electromagnetic radiation. Fluorescent emission wavelengths may include, but are not limited to, a wavelength in the visible region.

Commonly used readout light wavelengths for the optical information media 420 include 400 nm, 440 nm, 630 nm, 650 nm, and 780 nm, while other readout wavelengths are possible. The coating produced or selected for use does not appreciably absorb light at the wavelength used by the readout system.

Example coating materials were produced using materials that included a color former, a photo acid generator, a diacrylate and a photoinitiator added together in appropriate amounts. In order to test the properties of the sample coating materials, different photo acids and different color formers were used with a single diacrylate and a single photoinitiator. The diacrylate used was SR-238 (1,6 hexanediol diacrylate), from Sartomer Corporation, and the photo-initiator used was KTO-46, from Sartomer Corporation. SR-238, 1,6 hexanediol diacrylate is a low viscosity, fast curing monomer with low volatility, a hydrophobic backbone, and good solvency for use in free radical polymerization. KTO-46 is a blend of phosphine oxide, alpha-hydroxy ketone and a benzophenone derivative. KTO-46 is a liquid photoinitiator that can be incorporated by simply stirring into a resin system. KTO-46 is insoluble in water and is soluble in most common organic solvents and monomers. The color formers used, which were products of Noveon, Incorporated, are indicated in the following table. The following table shows the color formers and photo acid generators used.

| Color formers (Noveon, Inc.) | Photo acid Generator |
|---|---|
| Copikem 16 Red | (tert-butoxycarbonylmethoxynapthyl) diphenyl sulfonium triflate |
| Copikem 5 Green | (4-phenoxyphenyl) diphenyl sulfonium triflate |
| Copikem 34 Black | (4-tert-butylphenyl) diphenyl sulfonium triflate |

In these embodiments, 1 to 5 wt % of color former and photo acid were used, depending on the solubility of the components. It was found that a slight excess of photo acid was desirable to account for color development. Other embodiments may include the use of visible and fluorescent dyes to further enhance contrast or visual appeal. In one example of an additional embodiment, Quinoline Yellow was added at 0.5 wt % to create a coating on a CD that provided a yellow background. In another embodiment, a chelate of europium, Europium (III) tris(napthyltrifluromethyl acetonate), was used to impart red fluorescence without any visible color. In another embodiment, Quinoline Yellow and Europium (III) tris(napthyltrifluromethyl acetonate) may be suitably combined to create a visibly yellow disk with a fluorescent red color. The foregoing combinations, and equivalents thereof not provided herein, are embodiments of materials that are suited for practice of this invention.

Figure 2:
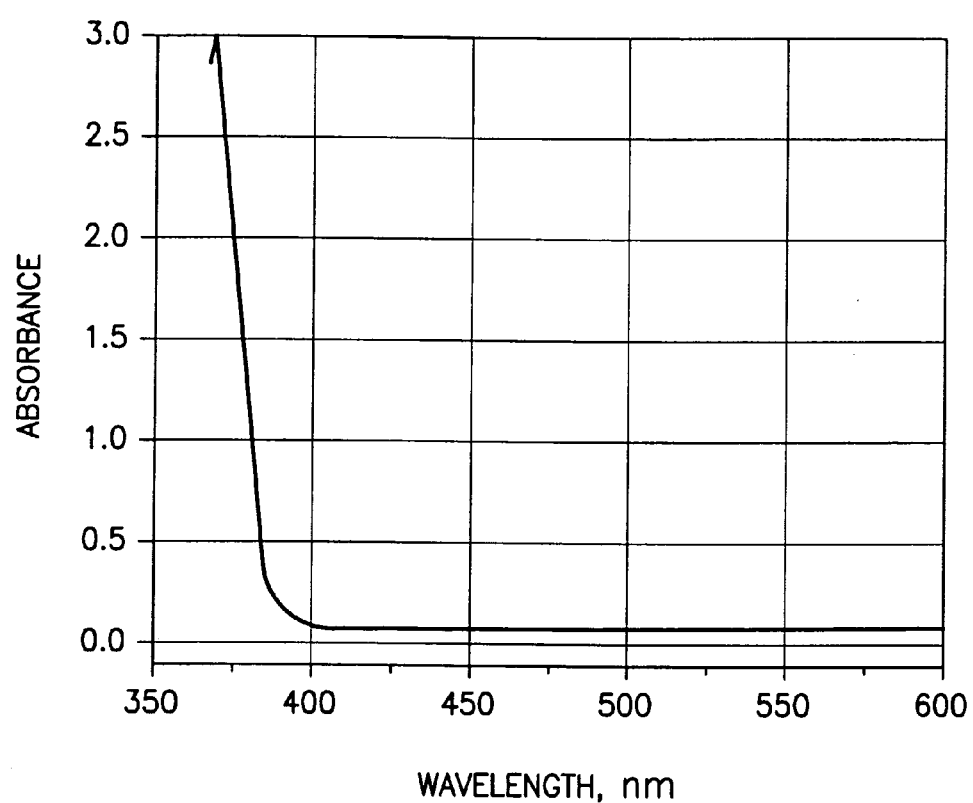
FIG. 2 is a graph that depicts the spectrum emission from a long pass filter used for curing a coating.

As an example of one technique for application of the coating 450, the coating 450 was applied to a series of optical media 420. The coatings 450 were applied by spin-coating, and a Xenon RC-747 UV flash-lamp unit running at 10 pulses per second was used to cure the samples. In order to avoid photoinduced color formation during the curing, the lamp output was filtered through a long pass filter with the cut-off wavelength of approximately 380 nm. The spectrum of the curing lamp is shown in FIG. 2. The total power density in the spectral region below 400 nm delivered to the samples with the filter in place was approximately 100 mW/cm$^2$. The coating 450 hardened after a minimum exposure time of two seconds, however, complete curing required an exposure time of approximately five to six seconds at this power density. No visibly noticeable color formation took place for exposure times of up to ten seconds.

An example of a suitable combination of the Quinoline Yellow and Europium (III) tris(napthyltrifluromethyl acetonate) is a formulation containing 1.5% Copikem 16 Red, 1.5% (tert-butoxycarbonyl methoxynapthyl) diphenyl sulfonium triflate, 0.5% Quinoline Yellow, 0.5% Europium (III) tris(napthyltrifluromethyl acetonate), and 96% SR-238 with 10% KTO/46. In this embodiment, under long wave UV excitation, the disk appears to have a bright red background with a dark red to black image disposed within the background.

Marking Schemes

An information bearing marking 432 is formed using a convention that may include, but is not limited to, incorporation of text information, such as alphanumeric characters, symbols, graphic information, such as a logo, a barcode, or any other information or symbols that may be suitable for including in the marking 432. The marking 432 may further include embedded information and authentication signatures, and can be a digital watermark 435.

The information bearing marking 432 may convey any desired information. For example, the information bearing marking 432 may present content that includes identification information (such as a serial number), authentication information, and/or instructional information. The content may also include advertising, branding, or promotional information, referred to collectively herein as "promotional information." The information included in the information bearing marking may include, but is not limited to, any of the foregoing types of information, or combinations. For convenience, the term "content" as used herein refers to content of the information bearing marking 432, and can be an image, alphanumeric text and other symbols, graphics, and combinations of images and symbols.

Figure 3:
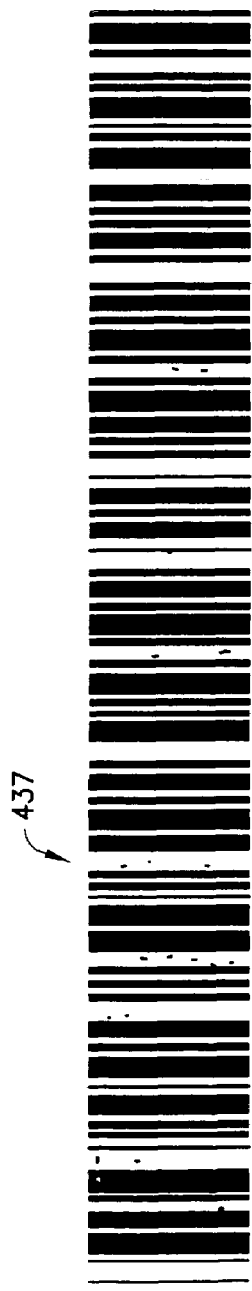
FIG. 3 depicts an information bearing marking, in the form of a bar code, that contains a digital watermark.

This invention may be used in any optical information media 420 where a coating may be applied. In one embodiment, a datacode symbology is applied so as to include the digital watermark 435. FIG. 3 shows one embodiment of a datacode symbology where the digital watermark 435 is incorporated into a bar code 437. The datacode symbology may be implemented using any suitable symbology including, without limitation, 3 of 9, I 2 of 5, Code 128, UPC, 2-D and 3-D symbologies. The digital watermark 435 may be incorporated as a digitally embedded imprint in the bit pattern or noise of a digital image of the datacode 437. The digital watermark 435 may be applied such that it is recoverable using software, or other automated or manual techniques. The digital watermark 435, and the other information which may be embedded in the digital watermark 435, is robust to image deformations, rotations, copying, multiple renderings, conversions, and other manipulations.

The information included in the digital watermark 435 is dependent upon, among other things, the needs of the user. For example, the features of CD and DVD optical information media 420 provide opportunities for manufacturers to include diverse information such as described below. Although the information is described in terms of CD and DVD media, it is considered illustrative only, and not limiting of the invention.

In one embodiment, the invention provides for the use of one or more physical characteristics or attributes of the article 420 as at least one input for creating the digital watermark 435. For example, the digital watermark 435 may include information regarding the size of data files, or the date recorded. The physical characteristics may be directly or indirectly observable.

In another embodiment, the digital watermark 435 contains distribution chain information. For example, the digital watermark 435 may include attributes of the information recorded on the article 420, including but not limited to, date of manufacture, country of origin, authorized distribution channel.

In a further embodiment, the digital watermark 435 contains information regarding the attributes of the optical information media 420. For example, the digital watermark 435 may include attributes of the information recorded on the article 420, including but not limited to, the number of recorded titles, the author, the playtime of the CD or DVD, copyright dates, a serial number, an indication of the content owner, etc.

In another embodiment, the digital watermark 435 may also carry additional information that may not be discernable without knowledge of the digital watermark 435 and the ability to read the information included therein. This indiscernible information, may be useful for various applications, for instance, to impede the diversion of branded products.

In a further embodiment, generation of the digital watermark 435 includes use of an algorithm where information, such as, but not limited to, information derived from media attributes is entered. The algorithm may include, but is not limited to, a discrete cosine transform, a seed for a pseudorandom number generator, where the random number is used as a hash, or some other one-way function for generating the digital watermark 435.

In one embodiment, the digital watermark 435 appears as one unified image. In other embodiments, the digital watermark 435 appears as multiple unified images. In further embodiments, the digital watermark 435 appears in fragments scattered over the article 420. In other embodiments, the digital watermark 435 is effectively layered, through use of varied materials in the coating 450, and through appropriate control of the marking process. In this embodiment, it is possible to make use of distinct wavelengths associated with the various layers of the marking 432 during the readout process.

Figure 4:
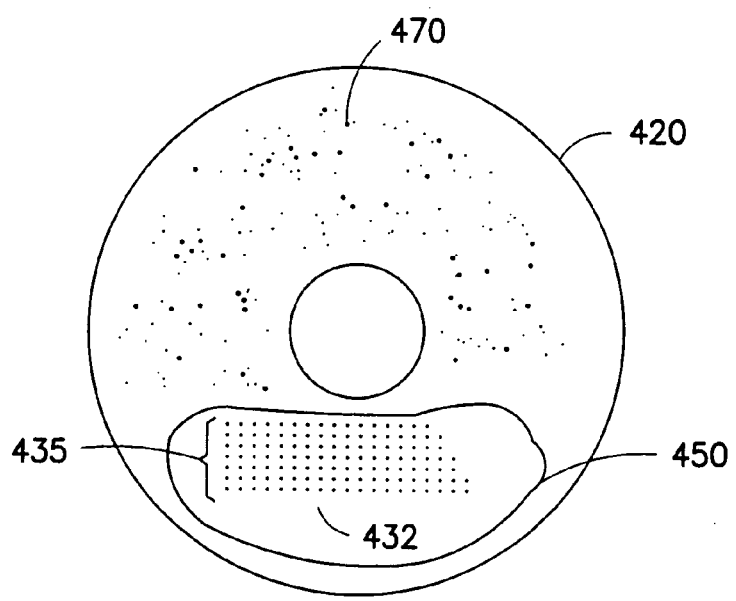
FIG. 4 is a diagram of optical media, such as a CD or DVD, that contains a coating containing a marking that includes a digital watermark, and that further includes taggants.

U.S. patent application "Authentication Using a Digital Watermark", Ser. No. 09/801,445, filed Mar. 8, 2001 by Lawandy, Nabil M., and commonly assigned, is herein incorporated by reference. application Ser. No. 09/801,445 discloses, among other things, use of a digital watermark 435 for authentication purposes. application Ser. No. 09/801,445 discloses methods that include the use of security features, or taggants, such as, but not limited to, fibers or particles, disposed on the article 420 upon which the digital watermark 435 appears. FIG. 4 provides an example of an optical media 420 that includes taggants 470 as an additional security feature.

The use of the taggants 470 is a further aid to the authentication of an article 420. Specifically, certain physical attributes of the taggants 470 disposed upon an article 420 offered for authentication may be evaluated, and compared against the same physical attributes for taggants 470 associated with an authentic article 420.

Taggants 470 may appear in a variety of forms, including but not limited to, fibers, particles or deposits of ink. Material used for formation of a taggant 470 is selected on the basis of, but not limited to, durability, detectability, cost and limitations of the application process. For example, suitable material for formation of a taggant 470 may include, but is not limited to, metal, plastic, ink, and fiber. The taggants 470 do not interfere, or substantially interfere, with the functionality of the optical media 420.

Physical attributes of the taggants 470 that may be evaluated include, but are not limited to, magnetic properties, radio frequency properties, size and shape, loading factor, color and wavelength emission, and positioning on the article 420. Information derived from evaluation of the taggants is used to further establish the unique character of the digital watermark 435.

Forming a Mark 432

The technique for forming a marking 432 disclosed herein is based on the property that some materials become substantially absorbing of UV light due to prior exposure to UV light. This property is referred to as photoabsorption, and is applied in a manner consistent with the teachings herein to create a latent contrast in the coating 450.

Methods for exposure of the coating 450 of the optical information media 420, also referred to as "substrate" 420 to UV light include, but are not limited to, use of a UV laser, or use of a UV source in combination with a positive or negative photomask. In one embodiment, a UV laser is controlled by a preprogrammed system, which has the ability to control positioning, power levels, and other factors. In other embodiments, selective irradiation of the coating 450 involves use of a photomask that includes features to provide for special effects, such as those needed to create the perception of shading.

In practice, various factors will determine the degree of absorption, and characteristics of the UV sources used to expose the substrate 420. Such factors include, but are not limited to, contrast requirements, response of the material in the coating 450, characteristics of the lighting fixture and application constraints such as character and detail of the image being inscribed. Various embodiments are disclosed herein for UV based inscription of optical information media 420.

Figure 5:
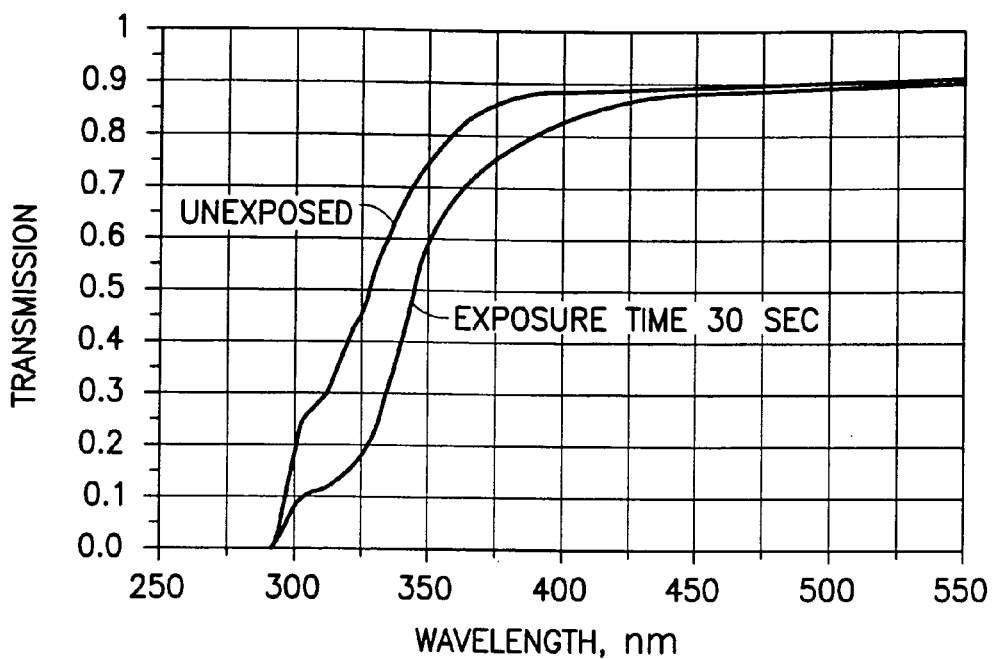
FIG. 5 is a graph showing the transmission spectra of a polycarbonate substrate before and after UV exposure.

FIG. 5 is an example of a first arrangement where photogeneration of defects create a latent contrast in a substrate 420 containing polycarbonate material 450 is viewed with UV light. This example is an example of a substrate 420 that contains materials inherently included in the substrate 420, that are suitable for practice of this invention. Consistent with the foregoing discussion of the coating 450, these materials are referred to, for convenience, as a "coating 450."

In FIG. 5, the transmission spectrum of a polycarbonate coating 450 before and after exposure to UV light is shown. The light was produced by a Xenon RC-747™ pulsed lamp, which has a peak power of 1,811 watts per $cm^2$. FIG. 5 reveals that the transmission spectrum for the exposed polycarbonate coating 450 is distinct from the transmission spectrum for the unexposed coating 450. The distinction is most apparent in the upper portion of the UV spectrum, between about 300 nm and about 400 nm. This property is exhibited by a number of glasses and polymers, where photogeneration of defects contribute to the absorption in the UV region. In other embodiments, glasses, other polymers, or other materials are used as a substrate material.

Figure 6:
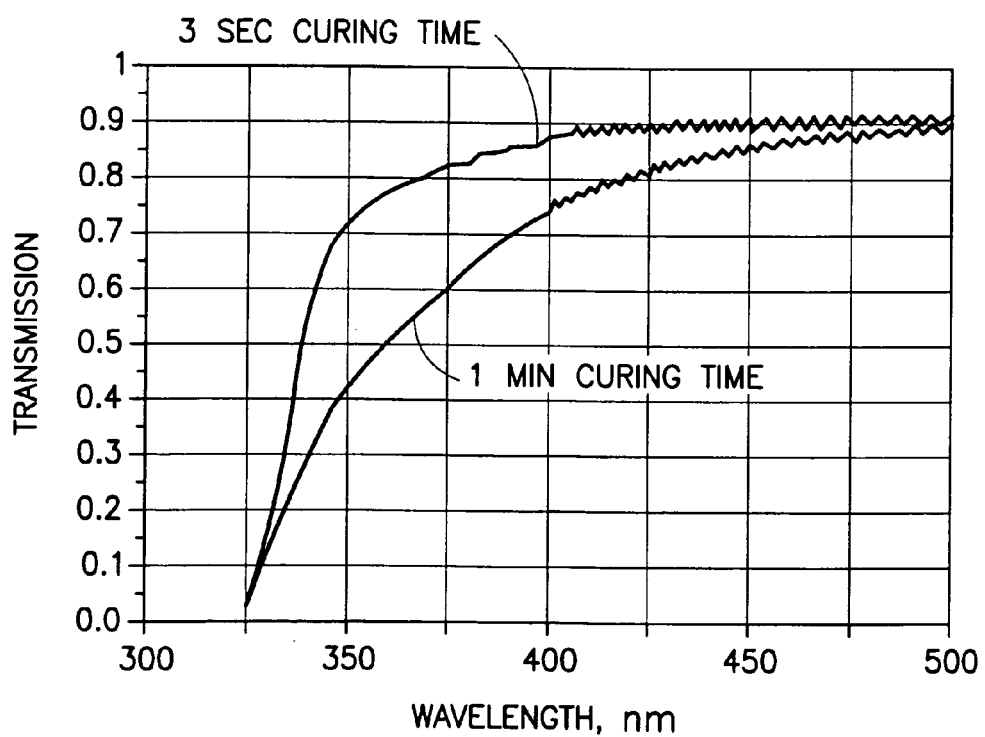
FIG. 6 is a graph showing the transmission spectra of a lacquer after two different exposure intervals to UV.

FIG. 6 is an example of a second arrangement where polymerization of a monomeric coating 450 is used to modify the photoabsorption by the coating 450 of UV light. In this arrangement, a UV curable polymer is subjected to UV exposure. FIG. 6 shows the transmission spectrum of a 19-μm-thick layer 450 of Sony Chemicals adhesive SK640™ designed for use in DVD format optical media. The adhesive is UV curable, and is characterized by being a clear, spin-coatable, free radical, acrylic adhesive designed to offer fast cure speed, low shrinkage, excellent bond integrity, dimensional stability, and high optical clarity.

The adhesive was cured by UV light from a Xenon RC-747™ pulsed lamp. Two separate curing times were used, with a total exposure time of three seconds and one minute. Like FIG. 5, FIG. 6 reveals that the transmission spectra for the more highly exposed sample (one minute) is comparatively lower than the minimally exposed sample (three seconds). In this embodiment, the fraction of the transmission spectra is also lower in the upper UV region of the electromagnetic spectrum, and into the region of visible light (above about 400 nm).

The disparity in the transmission spectra between the two curing times is due to the effect that since UV light leads to polymerization of the coating, the degree of UV exposure will determine the degree of polymerization of the material, and therefore, the optical properties of the coating (UV absorption in particular). Thus, the greater the exposure to UV during the curing, the greater the polymerization, and the greater the UV photoabsorption.

In other embodiments involving UV curable polymers, other polymers are used, including but not limited to, other adhesives and specialty coatings suited for use in manufacture of other formats of optical media 420. Further embodiments use polymers suited for inscription of information bearing markings in items such as, but not limited to, automobile windshield glass, safety equipment, driver's licenses, passports, immigration cards, smart cards, credit cards, and other valuable items and documents.

Figure 7A:
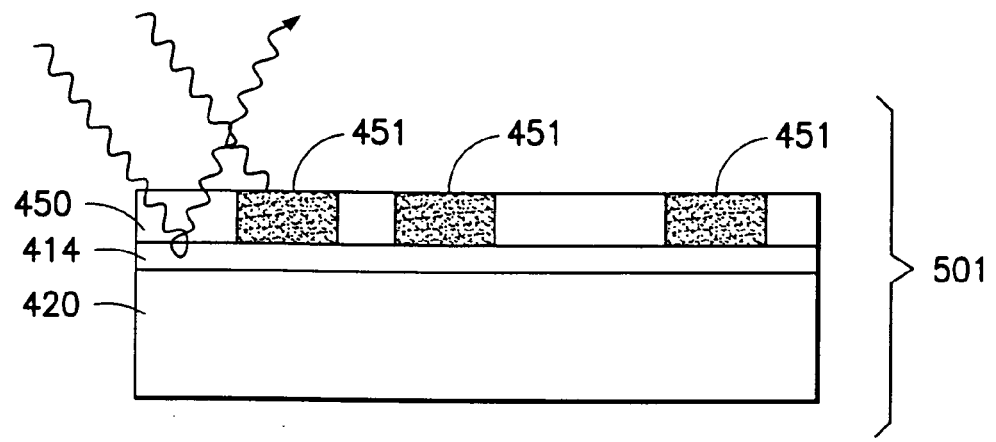
FIG. 7A–B, collectively referred to as FIG. 7, are schematic diagrams of a coating and fluorescent material applied over a substrate.
Figure 7B:
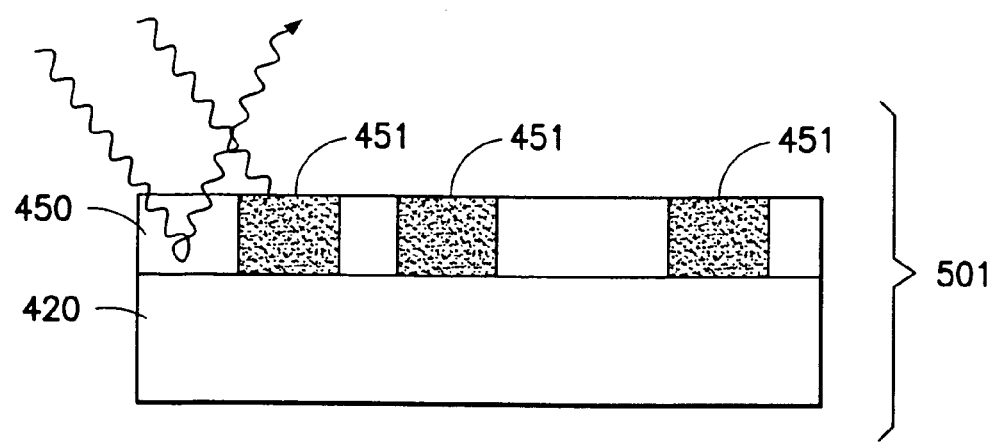

In the two arrangements above, the selective exposure of some areas of the coating 450 results in the formation of a latent contrast between the exposed and less exposed or unexposed regions of the coating 450S. FIG. 7A–B, collectively referred to as FIG. 7, provides a schematic diagram of embodiments of invention. These embodiments are considered illustrative, and are not intended to be limiting of this invention. In FIG. 7A the coating 450 is shown applied over the substrate 420. Sandwiched between the coating 450 and the substrate 420 is a fluorescent layer 414, which collectively create a sandwich 501. Wavelengths of UV light directed to the sandwich 501 are absorbed in the previously exposed regions 451 of the coating 450. The wavelengths of light that are not absorbed in the coating 450 excite materials in the fluorescent layer 414, which emits light at a characteristic wavelength. FIG. 7B shows an alternate embodiment, where fluorescent material is incorporated into the coating 450. A third embodiment is shown in FIG. 8, where fluorescent material is foreign to the assembly, and introduced to the substrate 420 for viewing.

Figure 8:
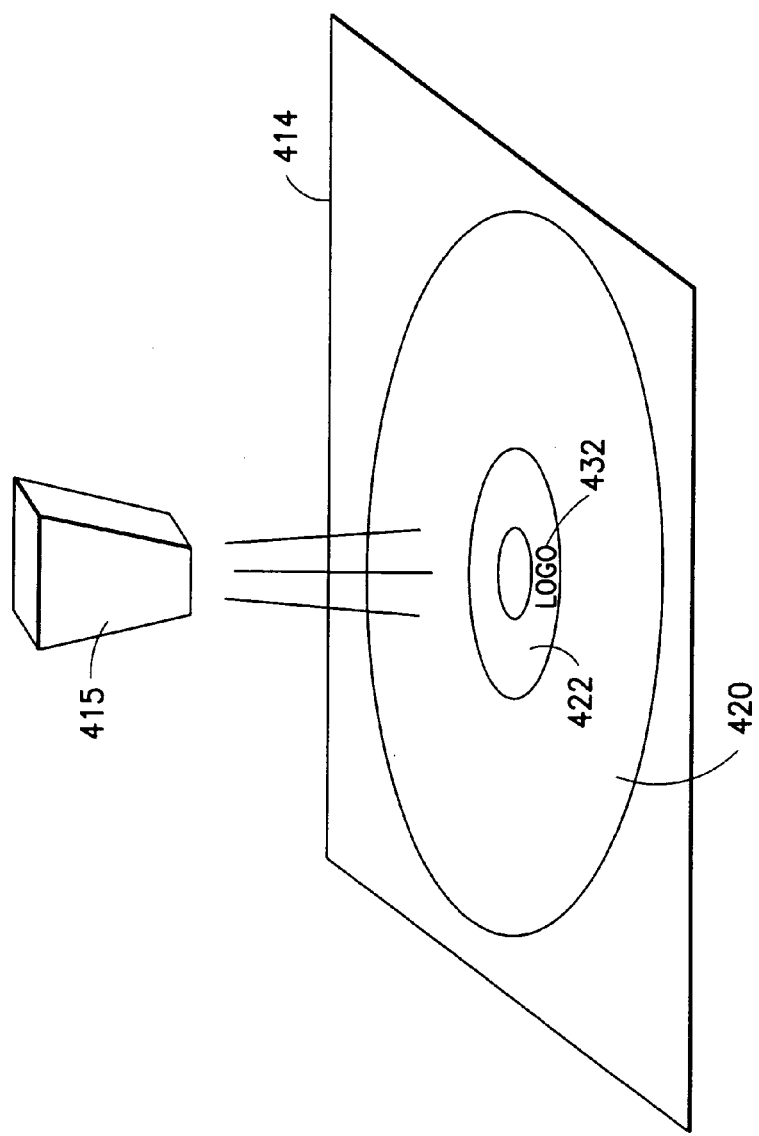
FIG. 8 is an illustration of an optical media with an information bearing marking inscribed in the clamping area.

FIG. 8 is an illustration of an embodiment where information has been transferred onto an optical media 420. In FIG. 8, the optical media 420 is a CD or DVD, which has a central clamping area 422 that is not used for the storage of data. The central clamping area 422 is substantially transparent. In this embodiment, an information bearing marking 432 is transferred in the clamping area 422 through use of a photomask. The information bearing marking 432 was previously transferred in a predetermined pattern according to the needs of the user. In this embodiment, viewing of the information bearing marking 432 involves placing the optical media 420 over a fluorescent background 414. The fluorescent background 414 is independent of the optical media 420, and is supplied to provide contrast when exposed to low intensity UV light. Low intensity UV light is supplied by a low intensity UV light supply 415. Once the optical media 420 is placed over the fluorescent background 414 and exposed to UV light from the low intensity UV light supply 415, the latent contrast from the UV transfer becomes apparent and the information bearing marking 432 becomes visible.

In a third arrangement, known as photobleaching, irradiation with UV light induces modification of the coating 450. In one embodiment, this includes molecules of a fluorescent additive dispersed in a polymeric matrix. In this embodiment, the fluorescent additive dispersed in the polymeric matrix is susceptible to UV radiation, while the polymeric matrix may or may not be susceptible to UV. An information bearing marking 432 is imprinted into the matrix using an adequate exposure of UV, through use of a photomask, a UV laser, or other suitable means. Once exposed to adequate quantities of UV, the additive molecules are modified by the UV photons and no longer produce fluorescence with the same intensity as before exposure to UV radiation. The information bearing marking 432 in this embodiment may also be viewed by illuminating the substrate 420 with low intensity UV light.

In each of the arrangements, the selective irradiation of substrate 420 with UV is used to inscribe images or information bearing markings 423 into the substrate 420. The selective irradiation may be used to provide for varying degrees of contrast with the unexposed, or lesser exposed, regions of the substrate. That is, varying shades within an image may be created. For example, increased UV exposure and therefore increased polymerization in one part of a coating 450 will cause greater absorption than exhibited in another part of the coating 450. Shading effects may be achieved with a positive or negative photomask, through laser writing techniques or other techniques. The shading effects may, among other things, be incorporated into information bearing markings containing a digital watermark.

An example of a technique for varying the contrast in a transferred image includes engaging the same techniques used in grayscale printing. That is, using a collection of properly sized colored shapes or patterns, on uncolored background, or alternatively, uncolored shapes or patterns on fully colored background. Regulating the size and density of the shapes or patterns provides for control over the visual perception of color intensity in any specific region of the marking 432.

Figure 9:
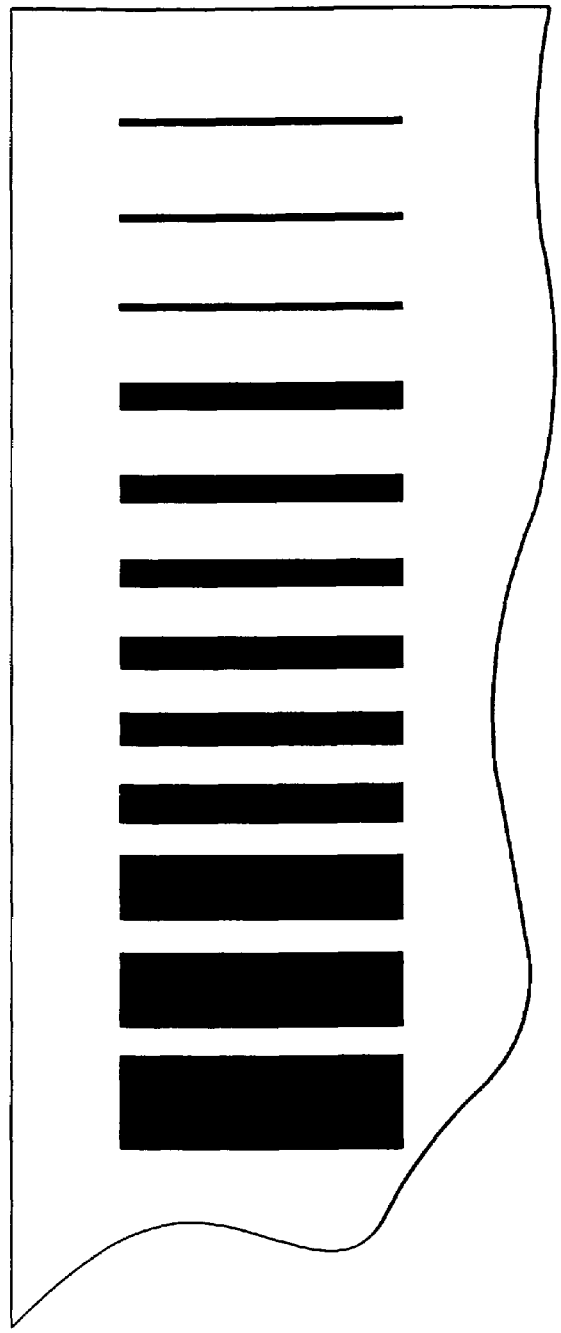
FIG. 9 is a blow up diagram of a portion of a photomask, where the portion is used to create a shading effect.

FIG. 9 provides an example of the technique where contrast may be established by use of a photomask. FIG. 9 depicts a blown up cutaway section of a corner of a photomask, wherein the perception of shading is established by controlling the size and orientation of the rectangles in the photomask. In another embodiment, shading may be achieved through controlling the duration, power level, or other factors, governing exposure with a UV laser.

The covert and overt marking of materials with UV light inscribed information bearing markings 432 may be realized in various embodiments. The following are examples where the invention is employed, however, these embodiments should not be considered limiting of the invention. These embodiments are considered illustrative of aspects of the invention.

In one embodiment of covert marking, a fluorescent material is applied between the layers of a media 420, including, but not limited to, a DVD. In a version of this embodiment, the fluorescent material is a polymeric material. The fluorescent material is applied on the readout side, the non-readout side or both sides. The fluorescent material may be applied through means including but not limited to, spin coating. The DVD 420 is then exposed to intense UV light. The UV exposure is adequate to create the desired quantity of photoabsorption of UV in a layer of material in the DVD 420. The UV exposure may be completed by methods that include, but are not limited to, use of a photomask or a laser. Subsequent illumination with low intensity UV light generates a visible contrast fluorescence pattern. In this embodiment, the fluorescent material used as a contrasting background is integrated into the DVD 420, and subsequent introduction of an independent fluorescent background is not necessary for viewing of the otherwise invisible pattern, image, or information bearing marking 432. In the embodiment where the image is imprinted on the readout side of the DVD 420, the UV wavelengths associated with the imprinted image do not substantially interfere with the readout mechanism, and data contained in the DVD 420 may be retrieved with substantial reliability. In another embodiment, a CD is used as an optical media 420.

In a further embodiment, a layer of a polymeric material containing a fluorescent dye is applied to the media 420. The polymeric material is applied to the read-out surface, the non-readout surface, or both sides. The polymeric material may be applied by spin-coating or other suitable methods, and subsequently cured. The coating 450 is uniform and transparent in the visible and near-IR regions of spectrum and therefore does not produce interference with the read-out laser beam. That is, the interference does not have a substantial effect on the operation of the readout system. Uniform fluorescence can be observed over the coated area at this point in the manufacturing process. An information bearing marking 432 is then transferred into the coating 450 by exposure to UV. The UV may be used to imprint an image through a mechanism that includes, but is not limited to, photogeneration of defects in the polymeric material containing fluorescent materials, or modification of the fluorescent pigment through photobleaching. The UV exposure may be completed by methods that include, but are not limited to, use of a photomask or direct writing with a laser. Subsequent illumination with low intensity UV light generates a visible contrast fluorescence pattern.

In a further embodiment of an overt marking, a layer of UV curable material containing a photoacid generator, an acid sensitive color former, was applied to the media 420 via spin coating. The coating was subsequently cured through use of a long pass UV filter that excluded wavelengths less than about 350 nm. The coating 450 used was a suitable combination of the Quinoline Yellow and Europium (III) tris(napthyltrifluromethyl acetonate) formulation, containing 1.5% Copikem 16 Red, 1.5% (tert-butoxycarbonyl methoxynapthyl) diphenyl sulfonium triflate, 0.5% Quinoline Yellow, 0.5% Europium (III) tris(napthyltrifluromethyl acetonate), and 96% SR-238 with 10% KTO/46.

Figure 10:
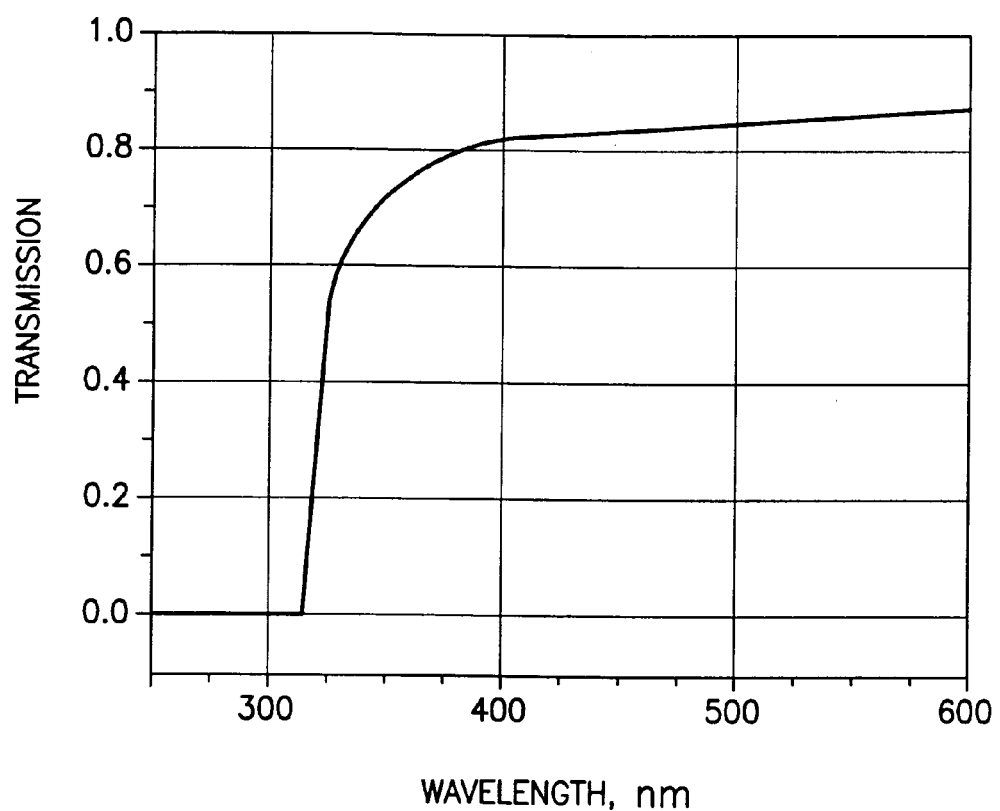
FIG. 10 is a graph that depicts that transmission spectrum of a plastic sheet used as a photomask substrate.

To produce a visible image in the cured coating 450, first a black-and-white negative of the image was laser printed onto a 60-μm-thick plastic transparency sheet. The transmission spectrum of the transparency sheet is shown in FIG. 10. In order to transfer the image onto the cured coating 450 on the CD 420, the transparency sheet was placed on top of the CD and illuminated with light from Xenon RC-747 flashlamp. This exposure caused the areas of the coating 450 below clear parts of the transparency to undergo color formation, while the areas of the coating 450 covered by black parts of the transparency remained uncolored. Total power density in the spectral region between about 300 nm and 400 nm delivered to the sample with transparency in place was approximately 240 mW/cm$^2$.

In this example, the exposed portion of the coating 450 became red colored by the reaction of the color former with the photogenerated acid, thus producing a CD 420 characterized by a yellow background with red information bearing markings 432 when properly illuminated. Under UV illumination, the red markings appear dark over a bright red fluorescent background. For demonstration purposes, the information bearing markings 432 included text, a bar code, a logo, and a digital watermark 435.

Detecting and Imaging the Marking 432

The markings 432 recorded in the coating 450 are preferably visible to the unaided human eye when illuminated with suitable light. Therefore, the marking 432 can provide for clear identification of the article 420 by means of display of information that may be interpreted by a user, such as a logo. In another embodiment, such as in the case of optical media 420, a marking 432 provided on the read side can be used to display identity information, such as a digital watermark 435, wherein other necessary information, such as an instruction for a user, may remain intact on the non-read side of the optical media 420.

Although in some embodiments, the markings 432 may be viewed by the unaided human eye, detection systems may be used as an aid, for among other things, to detect subtle features of the markings 432, and to decipher the marking 432 information. For example, in the case of a marking 432 that appears as a bar code, a bar code reader may be used to decode the information contained within the marking 432.

Figure 11:
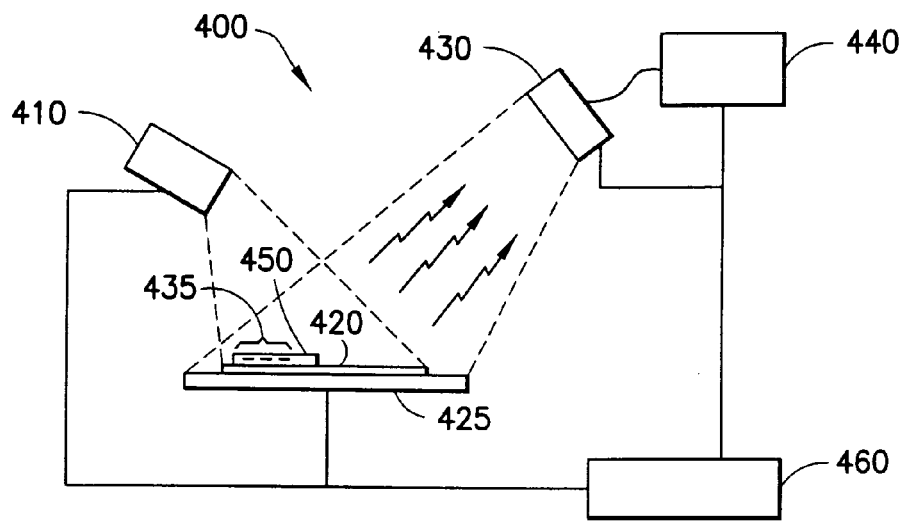
FIG. 11 is a diagram that shows components of a detection system suited for detection of information bearing markings.

An example of a detection system 400 in accordance with the invention is shown in FIG. 11. In this embodiment, a source of radiation 410 is directed on the article 420 to be examined, such as a CD ROM, a DVD, or another suitable type of optically encoded medium 420. The source 410 preferably generates UV radiation, but may generate any type of radiation that is suitable for detecting the coating 450 included on the article 420 and/or the marking 432, such as the digital watermark 435, or any appropriate attributes of the article 420. The article 420 may be mounted on a positioning device 425 in order to locate the article 420 for irradiation. The positioning device 425 may include a conveyor or any other type of device suitable for transporting or locating the article for irradiation. A detector array 430, such as a CCD, a camera that may be fixed, moveable or handheld, or any other suitable detection device, with appropriate support circuitry 440 detects an image of the article 420, the taggants as may be present, and the digital watermark 435. The source 410 and detector array 430 may also comprise positioning devices (not shown) for locating these devices for optimum performance. The detector array 430 is preferably capable of detecting the spectral content of any emissions, in addition to any other physical characteristics of the digital watermark 435, the taggants 470, or the article 420 for identification and authentication of the article 420. Control circuitry 460 directs the activity of the overall system 400, and in particular controls the source 410, positioning device 425, detector array 430 and support circuitry 440. Alternatively, the marking 432 of the article 420 may be read and decoded when inserted into the detection system 400, and only if the article 420 is authenticated is the readout process started or completed.

Figure 12:
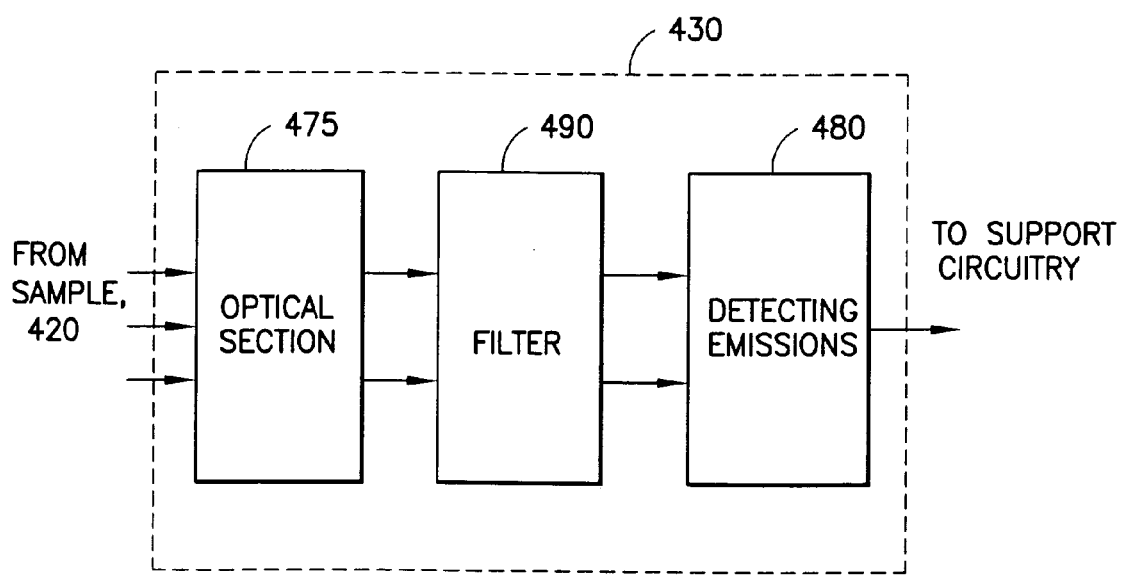
FIG. 12 is a diagram of components of a detector array used to detect information bearing markings.

As shown in FIG. 12, the detector array 430 is preferably comprised of an optical section 475 for focusing received emissions within the detector array 430, an array of sensors 480 for detecting the emissions, and a filter section 490 for allowing only the frequencies of interest to impinge on the sensors 480. The optical section 475 may include a microscope system or any other system suitable for magnifying or otherwise focusing the image of the article 420 and/or any emissions from the item 420 within the detector array 430. The sensor array 480 may comprise any array of sensors suitable for detecting the emissions and/or physical characteristics of the article 420, for example, a diode array, a CCD array, etc. Using this technique the output of the detector array 430 is analyzed to detect the characteristics of the digital watermark 435 and/or the coating 450 so as to identify and authenticate the article 420, such as by obtaining plural bit data.

Figure 13:
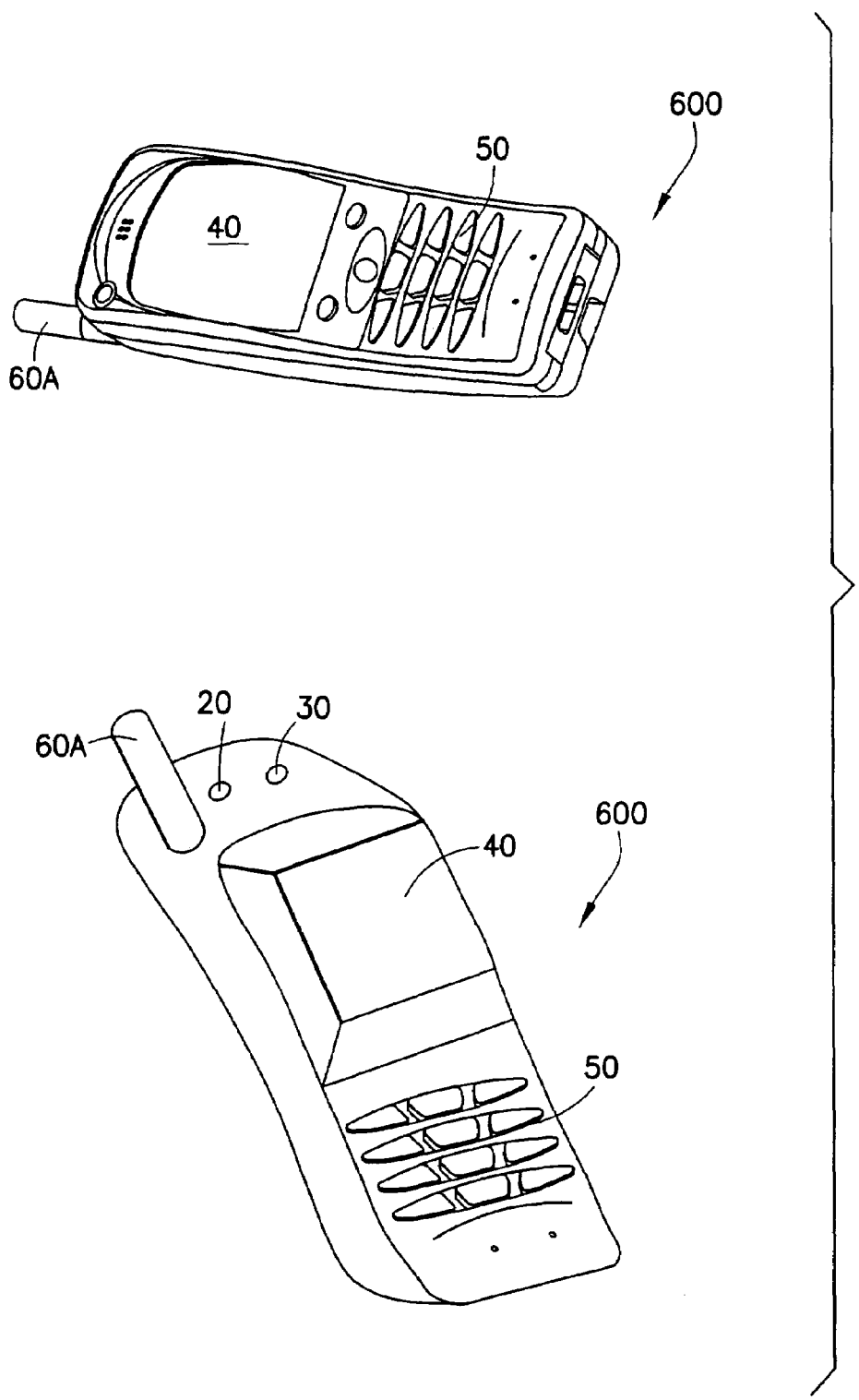
FIG. 13 is an exemplary diagram of a hand-held reader that is suited for detection of information bearing markings.
Figure 14:
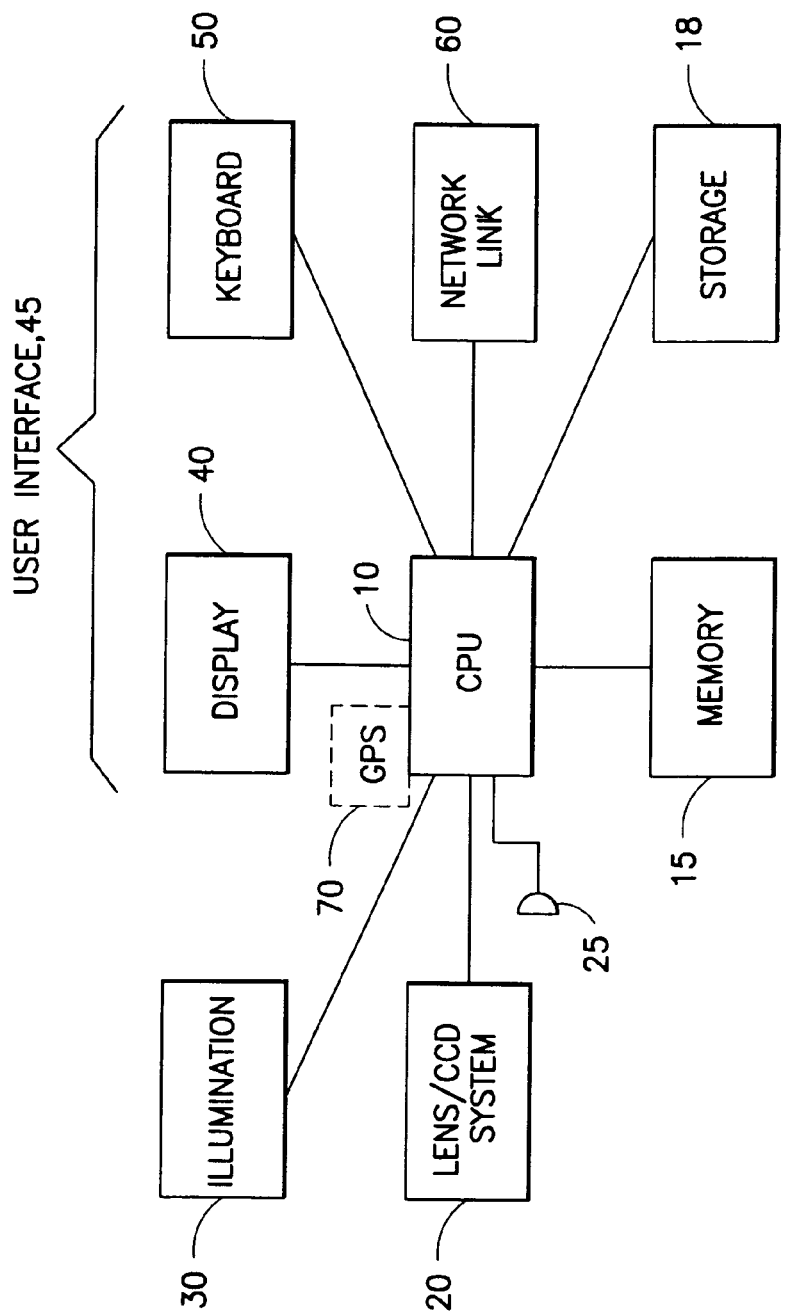
FIG. 14 is a schematic diagram of the components of the hand-held reader shown in FIG. 13.

It is also within the scope of the invention to use a handheld reader, such as a handheld reader with a self contained UV source, such as a xenon flash source. The reader may also include a CCD pixel array and a display. One suitable type of hand-held reader 600 is known as a VERICAM™, available from Spectra Systems Corporation of Providence, R.I., as shown in FIG. 13. FIG. 14 provides an overview of the hand-held reader 600.

Referring to FIGS. 13 and 14, the hand-held reader 600 includes a CPU 10, such as an embedded microprocessor, an internal read/write memory 15 and optional, preferably non-volatile mass storage 18. Also included is a digital camera lens/CCD system 20, at least one illumination source 30 and a user interface 45 that includes a display (LCD) 40 and a keypad or keyboard 50. The illumination source 30 can be a variable intensity source controlled by an operator, and it can also include a flash source. However, in some embodiments the illumination source 30 may not be necessary, depending on the ambient illumination conditions.

The lens/CCD system 20 and illumination source 30 can be located on a surface opposite that of the display and keyboard 50, enabling the operator to view the image being captured on the display 40, and to manipulate the keys of the keyboard 50 such as to make appropriate adjustments, initiate readout operations, and perform other functions, such as initiating a transfer of data to a remote location via a wireless network link 60 having, for an RF embodiment, an antenna 60A. The lens/CCD system 20 includes a digital camera of adequate resolution (e.g., 1.45 mega pixels or greater), with appropriate support circuitry providing auto-focus and other typically found features.

An optional microphone 25 can be provided for use with the presently preferred embodiment that includes a wireless transceiver. In another embodiment, a global positioning system locator (GPS) 70 can be used to identify the location of the hand-held reader 600.

The hand-held reader 600 may be battery powered, or powered by an external power supply. The hand-held reader 600 is sized so that the operator can readily manipulate it with one hand, in much the same manner that a user can manipulate a digital camera or a wireless communications device.

For the purposes of this invention, the CPU 10 and memory 15, 18 are assumed to be suitably programmed and operated so as to image and decode the marking or markings 432, such as the digital watermark 435, appearing on the optical information media 420. It is within the scope of these teachings for the hand-held reader 600 to also ascertain the presence and characteristics of the other subsidiary information that may be present in or on the coating 450, such as embedded particles 470, or other structures, as was discussed above. To this end, the hand-held reader 600 may include magnification optics, as was discussed above.

Deciphering the Marking 432

Information contained in the marking 432 may be obtained through a variety of means. A first method for obtaining information contained in the marking 432 is through visual interpretation, such as in the case of a logo. In other embodiments, detection systems, such as the foregoing exemplary systems are used to interpret the marking 432.

In one embodiment, one or more of the various inputs to the digital watermarking algorithm may be used as a "key" to "unlock" or otherwise obtain information included in the digital watermark 435. For example, data file size information could be used as a key, wherein file size information is compared to a known component of the digital watermark 435, providing the correct key enables a readout mechanism to obtain remaining information contained in the digital watermark 435.

In other embodiments, input information is used to unlock other information contained in various forms. For example, a key is used to unlock, a second digital watermark 435, or other information such as the data contained in the optical media 420.

In one embodiment, a second digital watermark 435 is readout at a different wavelength. In this embodiment, the second digital watermark 435 could be included as a visible marking 432, or an invisible marking 432, applied through means other than described herein. In a further embodiment, a second digital watermark 435, or other marking 432, could be applied as an overlay over the first digital watermark 435. As a further embodiment, if a properly designed readout system does not detect a genuine digital watermark 435, the optical information media 420 will not be read.

In a further embodiment, the taggants 470 are used as a security feature. For example, in one embodiment, special fibers may be disposed upon the optical information media 420 as taggants 470. These fibers may be substantially transparent at the readout wavelength, or located on a portion of the optical information media so as not to interfere with the readout process, such as the backside of a CD or in the clamping area 422. In this instance, the color and/or width and/or shape and/or emission wavelength of the fibers are evaluated against the known color, width, shape and/or emission wavelength of fibers appearing in an authentic article 420. In another embodiment, shown in FIG. 4, precise quantities of specifically sized micro-particles 470 that do not interfere with the readout process are disposed upon or in the coating 450 of the optical information media 420. In this embodiment, the authentication process may evaluate the quantity of micro-particles 470 per unit area and/or by particle size, or some other distinct physical attribute of the micro particles 470, prior to proceeding with the deciphering of the digital watermark 435. Another embodiment contemplates the use of magnetic materials in the coating 450, which are characterized by a known magnetic signature. A further embodiment comprises use of materials, including but not limited to, micro-particles 470 that emit characteristics wavelengths when illuminated. An additional embodiment contemplates distribution of the taggants in a pattern, such as, but not limited to, a visible logo. In these embodiments, one or more characteristics of the coating 450 are employed to read and decode the marking 432.

Additional embodiments of the invention disclosed herein may be realized in accordance with U.S. patent application, Ser. No. 09/801,445. These embodiments may be used, among other things, as keys, described above, and to provide for authentication of the optical information media 420.

Figure 15:
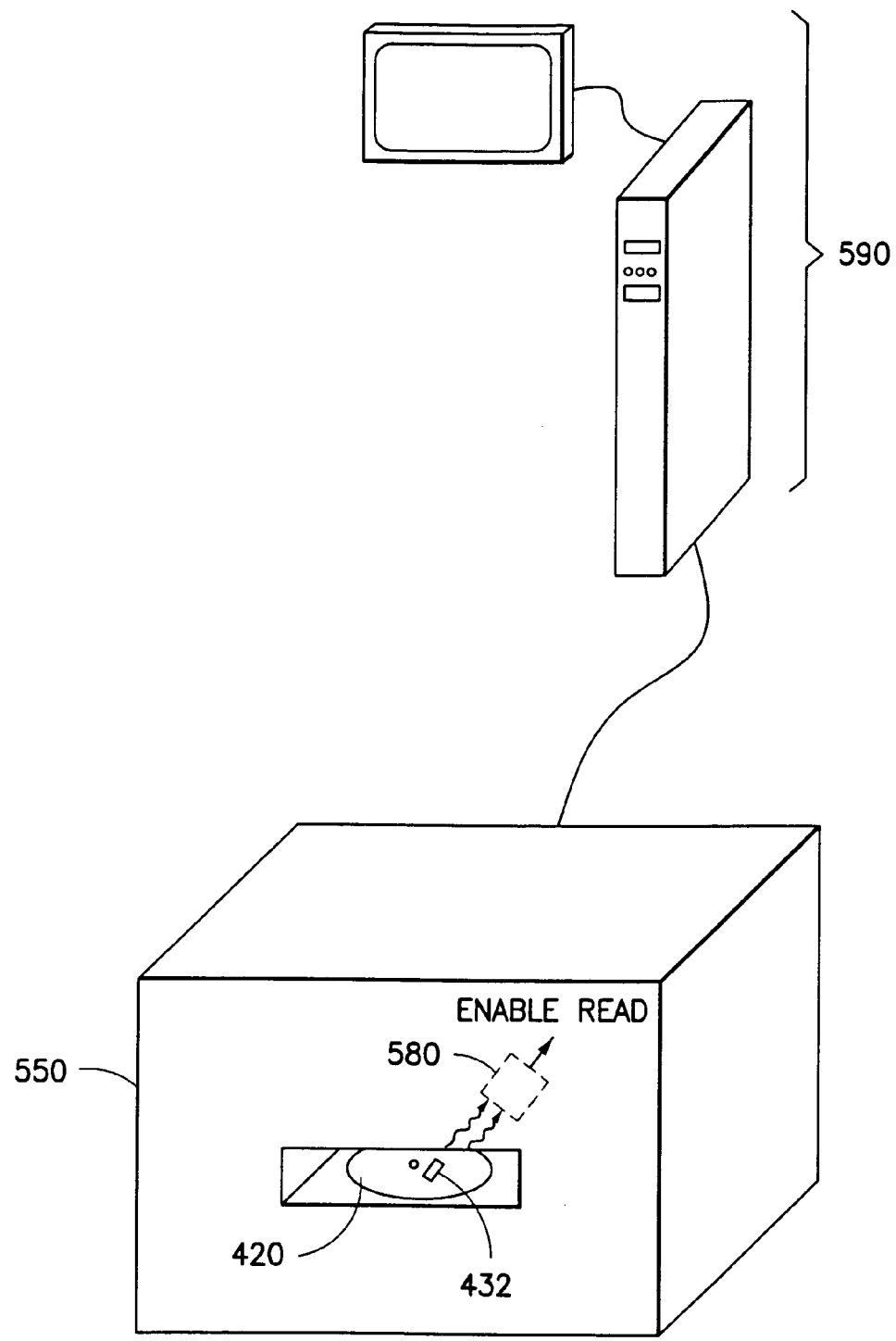
FIG. 15 is an example of a readout mechanism used to detect markings and authenticate marked optical media.

FIG. 15 provides an overview of another embodiment of this invention. In FIG. 15, the marking 432 is read by an appropriate detection system to obtain a decryption key. In one example of this embodiment, the optical information media 420 is introduced into a reader 550, that contains a marking detection system 580. The marking detection system 580 is devised to detect markings, which may exhibit, but are not limited to, magnetic, optical, or radio frequency properties. The marking detection system 580 is used to verify the authenticity or some other characteristic of the media 420, thereby enabling the optical information media 420 to be read (ENABLE READ signal is asserted). In another embodiment, the marking detection system 580 is used to compare physical attributes of the taggants (if present) to the known physical attributes of an authentic copy of the optical information media 420. Once the taggants indicate an authentic copy of the optical information media 420, the marking 432, such as the digital watermark 435, is read. Likewise, the once the digital watermark 435 has been used to authenticate the optical information media 420, a decryption key can be obtained from the digital watermark 435. The decryption key is loaded into the reader 550, which is then equipped to decipher the encrypted data contained in the optical information media 420. The process of authentication and/or decryption may occur, but is not limited to, automatically as the media 420 is inserted into a reader 550, it may be initiated manually after the media 420 is inserted into the reader 550, or through remote control with an external computer system 590.

It can thus be appreciated that while the invention has been particularly shown and described with respect to preferred embodiments thereof, it will be understood by those skilled in the art that changes in form and details may be made therein without departing from the scope and spirit of the invention. For example, a coating may be applied to documents, securities, forms of identification such as licenses and passports, credit cards, and other articles.

What is claimed is:

1. A method to apply an information bearing marking to an optical media, said method comprising:
    applying a coating to at least a portion of a surface of said optical media, said coating comprising at least one material sensitive to UV light, wherein said coating comprises at least one of a laser dye, a fluorescent dye, a metal chelate, an organic phosphor, and an inorganic phosphor;
    creating an image of an information bearing marking using a convention for representation of information; and
    photobleaching the coating to by exposing the coating to the UV light in a pattern derived from said image to reproduce said information bearing marking upon said optical media, wherein said photobleaching comprises photobleaching the at least one of a laser dye, a fluorescent dye, a metal chelate, an organic phosphor, and an inorganic phosphor.

2. A method as in claim 1, wherein said coating is applied to a readout side of said optical media.

3. A method as in claim 1, wherein said coating is applied to a non-readout side of said optical media.

4. A method as in claim 1, wherein said exposing comprises use of at least one of a laser, a positive photomask, and a negative photomask.

5. A method as in claim 1, wherein said optical media comprises at least one of a compact disc and a digital versatile disc.

6. A method as in claim 1, wherein readout wavelengths for said optical media comprise wavelengths of at least one of about 400 nm, about 440 nm, about 630 nm, about 650 nm and about 780 nm.

7. A method as in claim 1, wherein said coating is applied through means comprising at least one of printing, spraying, rolling, spin coating and painting.

8. A method as in claim 1, wherein said convention comprises at least one of text, alphanumeric characters, graphic information, a logo, a data code symbology, and a digital watermark.

9. A method as in claim 1, wherein the content of said information bearing marking comprises content relating to at least one of identification, authentication, instruction, advertising, branding and promotion.

10. A method to apply a visible information bearing marking to the readout side of an optical media, the method comprising:
    applying a coating comprising a color former and a photo-acid generator to the readout side of said optical media, the coating comprising at least one UV photosensitive material; and
    exposing said coating disposed upon said readout side to UV light in a pattern derived from an image comprising said information bearing marking,
    wherein said exposure of said coating disposed upon said readout side to the UV light induces visible changes in said coating to produce said visible information bearing marking upon said readout side.

11. A method as in claim 10, wherein exposing comprises use of at least one of a laser, a positive photomask, and a negative photomask.

12. A method as in claim 10, wherein said optical media comprises at least one of a compact disc and a digital versatile disc.

13. A method as in claim 10, wherein said coating is applied through at least one of printing, spraying, rolling, spin coating and painting.

14. A method as in claim 10, wherein inducing visible changes comprises photobleaching a material contained within the coating.

15. A method as in claim 10, wherein said information bearing marking comprises at least one of text, alphanumeric characters, graphic information, a logo, a data code symbology, and a digital watermark.

16. A method as in claim 10, wherein said information bearing marking comprises content relating to at least one of identification, authentication, instruction, advertising, branding and promotion.

17. A method to apply an information bearing marking to an optical media, said method comprising:
    applying a coating comprising a color former, a photo-acid generator, a diacrylate, and a photoinitiator to at least a portion of a surface of said optical media;
    creating an image of an information bearing marking using a convention for representation of information; and
    exposing the coating to a UV light in a pattern derived from said image, wherein said coating is modified by said exposure to the UV light to reproduce said information bearing marking upon said optical media.

18. The method of claim 17, wherein said color-former develops color comprising at least one of red, green, black and yellow.

19. The method of claim 17, wherein said photo-acid generator comprises at least one of (tert-butoxycarbonyl-methoxynapthyl) diphenyl sulfonium triflate, (4-phenoxyphenyl) diphenyl sulfonium triflate and (4-tert-butylphenyl) diphenyl sulfonium triflate.

20. The method of claim 17, wherein said diacrylate comprises 1,6 hexanediol diacrylate.

21. The method of claim 17, wherein said photo-initiator comprises a blend of phosphine oxide, alpha-hydroxy ketone and a benzophenone derivative.

22. The method of claim 17, wherein said coating is applied to the readout side of the optical media.

23. The method of claim 17, wherein said coating is applied to the non-readout side of the optical media.

24. A method to apply an information bearing marking to the readout side of an optical media, said method comprising:
applying a coating to at least a portion of said readout surface of said optical media, said coating comprising at least one material having UV photosensitive properties, wherein said coating comprises at least one of a laser dye, a fluorescent dye, a metal chelate, an organic phosphor, and an inorganic phosphor;
creating an image of an information bearing marking using a convention for representation of information, the image comprising at least one digital watermark; and
photobleaching the coating to by exposing the coating to the UV light in a pattern derived from said image to reproduce said information bearing marking upon said readout surface, wherein said photobleaching comprises photobleaching the at least one of a laser dye, a fluorescent dye, a metal chelate, an organic phosphor, and an inorganic phosphor.

25. A method as in claim 24, wherein said exposing comprises use of at least one of a laser, a positive photomask, and a negative photomask.

26. A method as in claim 24, wherein said optical media comprises at least one of a compact disc and a digital versatile disc.

27. A method as in claim 24, wherein readout wavelengths for said optical media comprise wavelengths of at least one of about 400 nm, about 440 nm, about 630 nm, about 650 nm and about 780 nm.

28. A method as in claim 24, wherein said coating is applied by at least one of printing, spraying, rolling, spin coating and painting.

29. A method as in claim 24, wherein said convention comprises at least one of text, alphanumeric characters, graphic information, a logo, and a data code symbology.

30. A method as in claim 24, wherein a content of said information bearing marking comprises content relating to at least one of identification, authentication, instruction, advertising, branding and promotion.

* * * * *